July 21, 1964     D. H. DAVIS ETAL     3,141,476

STEAM VALVE DISK ASSEMBLY WITH INTERNAL BYPASS VALVE

Filed Sept. 28, 1961

*INVENTORS*
*DONALD H. DAVIS*
*FREDERICK S. O'BRYON*

BY

*THEIR ATTORNEY*

United States Patent Office 3,141,476
Patented July 21, 1964

3,141,476
STEAM VALVE DISK ASSEMBLY WITH
INTERNAL BYPASS VALVE
Donald H. Davis, Scotia, and Frederick S. O'Bryon, Schenectady, N.Y., assignors to General Electric Company, a corporation of New York
Filed Sept. 28, 1961, Ser. No. 141,427
5 Claims. (Cl. 137—630.14)

This invention relates to large capacity elastic fluid valves, as used for the main stop valve of a steam turbine, particularly to such a valve having an internal bypass valve for reducing the opening force on the valve disk assembly, or for providing a minimum flow of steam during the starting cycle.

Valves of this type are subject to extremely heavy duty involving erosion of the moving parts by the rapidly flowing steam, which on occasion may contain entrained solid particles; and the relatively moving parts are also subject to substantial vibration forces. The particular problem which led to the development of the present invention was the need for an improved internal bypass valve construction which would provide appropriate self-alignment of the bypass valve relative to its seat, while permitting easy disassembly, yet being rugged enough to withstand the vibration and fluid forces imposed on the moving parts in operation.

Accordingly, an object of the present invention is to provide an improved disk assembly for a steam valve having an internal bypass valve for providing a certain flow through the valve disk assembly before the main valve disk opens.

Another object is to provide a valve disk assembly with an internal bypass valve of the type described which is extremely rugged and reliable, and provides for the requisite self-alignment of the bypass valve on the valve stem, and for easy disassembly of the bypass valve from the stem.

A still further object is to provide a self-aligning bypass valve disk assembly with means for preventing rotation and destructive vibration of the valve disk member on its stem, when in wide open position, due to the large forces imposed on the disk by the rapidly flowing steam.

Figure 1:
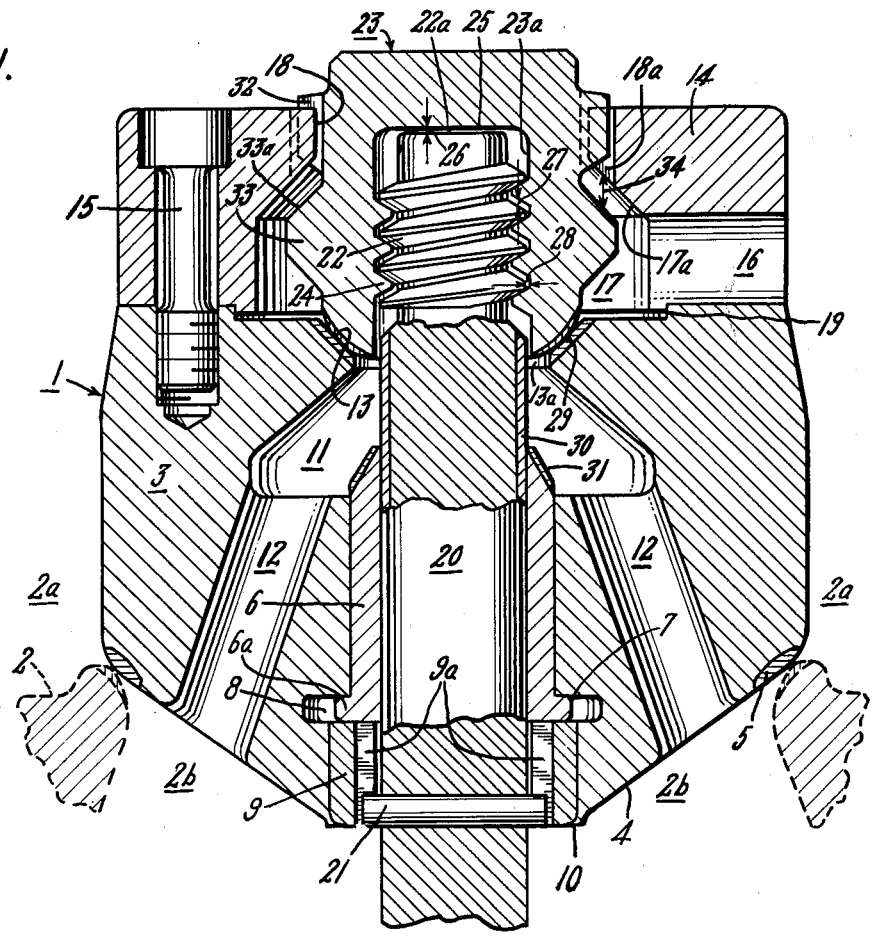
Figure 2:
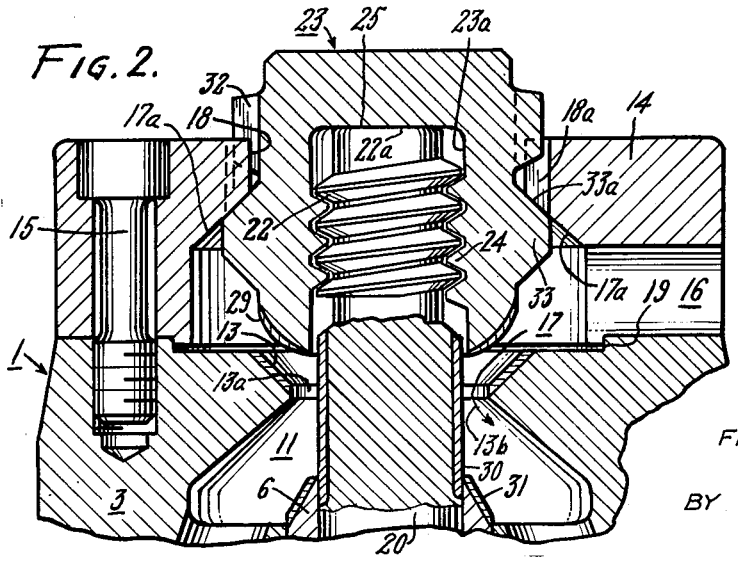

Other objects and advantages will become apparent from the following description taken in connection with the accompanying drawings in which FIG. 1 is a sectional view of a steam valve disk assembly having a bypass valve incorporating the invention, and FIG. 2 is a detailed view of the same assembly with the bypass valve in open condition.

Generally stated, the invention is practiced by providing a valve disk assembly with an internal bypass valve disk member supported on the valve stem by a very coarse helical thread having sufficient clearance to provide requisite self-alignment between the bypass valve disk and its seat, and with special key means for insuring that the bypass valve disk cannot rotate relative to the valve stem.

Referring now more particularly to FIG. 1, the novel bypass valve assembly is illustrated as applied to a valve disk assembly 1 having a lower circumferential portion adapted to engage the annular surface of a valve seat shown in dotted lines at 2. The housing in which the valve disk assembly is disposed is not important to the present invention, but it may be noted that this valve is of the general type disclosed in U.S. Patent 2,483,163 issued Sept. 27, 1949 in the name of G. B. Warren et al. and assigned to the same assignee as the present application. In such a valve, steam is admitted to an inlet chamber above the valve seat identified 2a in FIG. 1 and flows past the valve disk assembly 1 into a discharge chamber identified 2b.

The valve disk assembly 1 comprises a main body portion 3 of generally cylindrical configuration but having a conical lower surface 4. The peripheral portion of this lower surface is provided with a coating of hard surfacing material indicated at 5 where it contacts the cooperating surface of the seat 2. A central portion of the disk 3 defines an axial bore comprising a smaller diameter portion in which is disposed a cylindrical bushing 6 having a lower end flange 6a adapted to seat on a shoulder 7 defined by an annular recess 8. This bushing is retained in position by a retainer ring 9 which is in turn secured by rolling or peening a lip portion 10 of the lower disk surface 4 immediately surrounding the lower end of the retaining ring 9, as will be apparent from FIG. 1. Additional dowel or key means (not shown) may of course be employed, if necessary, to prevent bushing 9 from rotating in the disk 3. Retaining ring 9 is provided with a pair of diametrically opposed axially extending grooves 9a, the purpose of which will become apparent as the description proceeds.

The upper portion of the valve disk member 3 defines an enlarged central recess 11 communicating by way of two or more circumferentially spaced holes 12 with the lower surface 4 and the discharge chamber 2b. The uppermost central portion of the valve disk member 3 defines a conical seat portion 13 defining an annular passage 13a communicating with the internal chamber 11.

Secured to the upper end of the disk member 3 is a retainer cap member 14 held by a circumferential row of perhaps ten bolts 15. The cap member 14 defines a plurality of circumferentially spaced grooves 16 disposed between bolts 15 providing radial channels communicating between the steam inlet chamber 2a and an internal circular chamber 17. The upper portion of the cap member 14 defines a circular opening 18 in which are formed a plurality of circumferentially spaced axially extending grooves 18a, the function of which will appear hereafter. It will also be observed that the central chamber 17 has a conical upper surface 17a. The cap member 14 is maintained coaxial with the valve disk member 3 by a rabbet fit at 19.

The bypass valve assembly to which this invention particularly relates will be understood from the following.

The valve stem 20 is slidably disposed in bushing 6 and is provided with a transversely extending dowel pin 21, the projecting end portions of which engage the diametrically opposed grooves 9a in the retainer ring 9. Thus the valve disk member 3 is prevented from rotating relative to the valve stem 20. The extreme upper end portion of valve stem 20 defines a coarse helical thread 22, which loosely supports the internal bypass valve disk 23.

As will be apparent from FIG. 1, the bypass valve disk 23 has a central cylindrical recess 23a forming a coarse helical thread 24 mating with the thread 22 on the valve stem. The top surface of recess 23a is flat, as indicated at 25, and is adapted to be engaged by the flat upper end surface 22a of the valve stem. As shown in FIG. 1, there will be a clearance space identified 26 between the surfaces 22a, 25 when the valve is in the closed condition represented by FIG. 1. It will also be seen that the coarse helical threads 22, 24 define a very substantial axial clearance space identified 27 when in the closed position, the mating lower surface of thread 22 engaging the upper surface of thread 24, as shown in FIG. 1. It is particularly significant to note that the axial clearance space 27 defined between these coarse threads is significantly larger than the axial clearance space 26. For instance, with a valve stem 20 on the order of 2½ inches in diameter, the axial clearance space 27 may be on the order of ⅛ inch and the axial clearance space 26 on the order of ⅟₁₆ inch. It is also to be observed that there is a significant radial clearance space between the outside diameter of the coarse thread 22 and the internal diameter of the thread 24, as indicated at 28 in FIG. 1. This radial clearance may be on the order of $\frac{1}{32}$ of an inch.

The lower end portion of the bypass valve disk member 23 defines a spherical portion 29 adapted to seat on the conical surface 13 of the main valve disk member 3. Both the spherical surface 29 and the conical surface 13 may be coated with a suitable hard surfacing material, such as that known to the trade "Stellite," or otherwise suitably hardened to withstand the highly erosive action of the steam flowing through the annular orifice defined between the surfaces 13, 29 when the bypass valve disk 23 is caused to rise.

It will also be apparent that the annular jet of fluid flowing through the passage defined between surfaces 13, 29 will have a highly erosive effect on the valve stem 20, and therefore the valve stem may also be hard-surfaced, as shown at 30. Likewise, the beveled upper end surface of bushing 6 may be hard-surfaced, as shown at 31. Thus the portions of the internal bypass passage subjected to most serious erosive forces are suitably protected by erosion-resistant coatings.

In order to prevent the bypass valve disk member 23 from rotating on the thread 22, the upper peripheral portion of the disk member defines a plurality of circumferentially spaced radially projecting lugs or key members 32 engaging the axially extending grooves 18a in the cap member 14.

It remains to note that the outer circumference of the bypass valve disk member 23 defines a projecting annular flange 33 having a conical upper surface 33a adapted to abut the conical surface 17a of the cap member 14. It will be apparent that the axial clearance space identified 34 in FIG. 1 determines the travel of the valve stem 20 corresponding to maximum opening of the annular passage defined between surfaces 13, 29, which movement is that which occurs before the main valve disk 3 begins to rise from the seat 2.

The method of assembly of this valve disk unit will be fairly apparent from the above description of the structure.

The bushing 6 is first installed in the valve disk body 3 and secured by the retainer ring 9, as by rolling over or peening the lip 10. The upper threaded end of the valve stem 20 is then inserted through the bushing 6 until the transverse dowel pin 21 engages the axial grooves 9a. The bypass valve disk 23 is then threaded onto the upper end of the valve stem until the spherical seat 29 engages the conical seat 13, when the dowel pin 21 is just aligned with the lower end of the surface of the retaining ring 9, as shown in FIG. 1. The cap member 14 is then applied over the bypass valve disk 23 with the lugs or keys 32 engaging the grooves 18a in the cap, and with the holes for bolts 15 properly aligned.

It will be obvious that with this arrangement, the dowel pin 21 prevents the main valve disk member 3 from rotating on the stem 20, while the key means 32, 18a prevents the bypass valve disk 23 from turning on the threaded valve stem end portion. Thus all moving parts of the valve disk assembly are positively secured against the fluid forces which would otherwise tend to cause them to rotate.

As will be apparent from FIG. 1, when valve stem 20 moves downward in the closing direction, the coarse thread 22 of the valve stem engages the upper surface of the coarse thread 24, this thread engagement being sufficiently rugged to transmit the comparatively small forces required to pull the valve disk members 23, 3 to the closed position shown in FIG. 1 against gravity or whatever other forces may be tending to hold them in the open position.

The operation of this valve disk assembly when the valve stem moves in the open direction will be seen by reference to FIG. 2. As the stem 20 begins to rise from the closed position shown in FIG. 1, the first $\frac{1}{16}''$ of travel will cause the clearance space 22a between the flat end of the valve stem and the abutting flat surface of the bypass valve disk 23 to close, with the result that the engagement between the threads 24, 22 is opened on both sides of the threads, as shown in FIG. 2. That is, the entire opening force on the valve disk members is taken on the flat upper end of the valve stem 20, with no force being transmitted through the threaded joint. Further upward movement of valve stem 20 causes the internal bypass valve member 23 to rise until the conical surface 33a of the flange portion 33 engages the abutting conical surface 17a of the cap member 14. This movement causes the spherical seat 29 to define an annular orifice with the conical seat 13, so that steam begins to flow through the ports 16 and through the bypass valve seat opening 13a as indicated by arrow 13b in FIG. 2. It will be apparent that this high velocity flow impinges on the hardened surfaces 30, 31, these parts being protected against erosion by their hard surface coating. This bypass flow is of course discharged through the holes 12 to the downstream side 2b of the valve disk assembly. This flow permits warming up and starting the turbine, and tends to reduce the pressure differential across the main valve disk so as to reduce the force required on the valve stem 20 to raise the main disk member 3 from its seat 2.

It will be apparent from FIG. 2 how the very substantial forces required to lift the valve disk assembly 1 are transmitted through the flat end surface 22a of the valve stem, the abutting surface 25 of the bypass valve disk 23, and the abutting conical surfaces 33a of the bypass valve disk and 17a of the cap member 14. It will be seen that all these abutting surfaces are generously proportioned and well able to stand the substantial forces transmitted thereacross in opening the main valve disk. It will also be appreciated that engagement of the conical surface 33a with the conical surface 17a will tend to prevent the bypass valve disk 23 from vibrating on the loose thread connection 22, 24 in spite of the generous clearances provided between these coarse threads. Also, the main disk 3 will thus tend to be kept central on the stem 20, thus minimizing any tendency of the main disk to vibrate.

It may also be noted that there are generous radial and circumferential clearance spaces provided between the lugs or key members 32 and the cooperating grooves 18a. Thus there are no parts having close clearances between relatively moving parts, in which foreign solids might tend to collect, so as to cause sticking or galling. It will be observed that the very loose fit between the threads 22, 24 permits the bypass valve disk 23 to seat properly on the conical surface 13.

Thus it will be seen that the invention provides a simple valve disk assembly with an internal bypass valve ruggedly connected to the valve stem so as to provide suitable self-alignment and easy disassembly, with no danger of galling or sticking due to buildup of boiler compound or other solids entrained in the steam between any moving parts defining small clearances.

While only one specific form of the invention has been described, it will be apparent that many minor details of this valve disk assembly could be altered slightly without departing from the true spirit of the invention, and it is of course desired to cover by the appended claims all such modifications as fall within the true scope of the invention.

What I claim as new and desire to secure by Letters Patent of the United States is:

1. In a valve stem and disk assembly, the combination of a first main disk member defining a first central recess and an annular valve seat portion, a valve stem projecting into the main disk member and disposed for limited axial sliding motion relative thereto with the end portion of the stem projecting through said valve seat portion and disposed in said first central recess, a second valve disk member disposed in the first central recess and having a second central recess receiving the projecting end portion of the valve stem and an annular seat portion adapted to engage the valve seat portion of the main disk member, the projecting end portion of the valve stem and the central recess of the second valve disk member having interengaging coarse helical threads with first radial and second axial clearance spaces therebetween, whereby the second valve disk member is loosely carried on the valve stem for self-aligning seating on the first main disk member, the end surface of the valve stem forming a third axial clearance space with the adjacent bottom surface of the second central recess in the second valve disk member, said third clearance space being smaller than the second axial clearance space between the interengaging helical threads when the second valve disk member is in closed position, whereby movement of the valve stem in the opening direction first causes the third clearance space to close and further movement of the stem causes the second valve disk member to move away from its seat in the main disk member, with said second axial clearance space providing clearance on both sides of the interengaging helical threads, whereby the valve opening force is carried on the end of the valve stem with no load on the threads.

2. A valve disk assembly in accordance with claim 1 in which the external surface of the bypass valve disk member forms a conical surface spaced axially from and adapted to abut a cooperating conical surface in the main valve disk member when the bypass valve disk member is moved in the opening direction, the axial clearance space between said conical surfaces when the bypass valve disk is in closed position determining the maximum opening of the bypass valve opening formed between the bypass valve disk member and its seat in the main valve disk member.

3. A valve disk assembly in accordance with claim 1 in which the bypass valve disk member and the main disk member have interengaging key means for effecting relative axial motion therebetween while preventing rotation of the bypass valve disk member relative to the valve stem.

4. A valve disk assembly comprising a main valve disk member having an axial bore therethrough, a valve stem projecting into one end of said bore and having an end portion projecting from the other end of the bore, the valve stem being disposed for limited axial sliding motion in said bore, a cap member secured to said main disk member and forming with the main disk member a first central recess surrounding the projecting end portion of the valve stem, the main disk member having a portion forming a second central recess including an annular bypass valve seat defining an annular passage with the valve stem, and a cylindrical bypass valve member disposed in said first recess and having a third central recess receiving the extreme end portion of the valve stem, said projecting end portion of the valve stem and said third central recess forming coarse interengaging helical threads defining a first axial clearance space therebetween when the bypass valve member is in closed position abutting said bypass valve seat, the extreme end surface of the valve stem forming a second axial clearance space smaller than said first clearance space with an adjacent abutment surface of said third central recess, whereby axial movement of the valve stem first causes the second clearance space to close while said first axial clearance space provides clearance on both sides of said interengaging threads, whereby force is transmitted in the valve opening direction entirely through the end surface of the valve stem to the abutting surface of the third central recess with no load on the threaded portions.

5. In a valve disk assembly, the combination of a cylindrical main valve disk member defining a central axial bore therethrough, a valve stem disposed in said bore for limited axial sliding motion therein, interengaging key means preventing rotation of the main disk member on the valve stem, the end of the valve stem having a portion defining a coarse helical thread projecting from the end surface of the main valve disk member, the main disk member having a first central recess defining an annular passage with the valve stem and surrounded by a first annular bypass valve seat portion, a bypass valve disk member having a second central cylindrical recess defining a coarse helical thread loosely engaging the thread on the end of the valve stem, one end portion of the bypass valve disk member having a second annular seat portion adapted to engage said first annular seat portion of the main disk member, a circular cap member with a third central circular recess disposed around the bypass valve disk member with at least one passage for admitting fluid to the third central recess, means securing the cap member to the main valve disk member, the cap member and bypass disk member having abutting annular surfaces adapted to define a first axial clearance space therebetween when said first and second annular seat portions of the bypass disk member and main disk member are in engagement, the cap member and bypass disk member also having interengaging key means for preventing relative rotation while effecting relative axial sliding motion therebetween to the extent permitted by said first axial clearance space, whereby the bypass valve disk member may move from closed position with said first and second annular seat portions in engagement to open position with the abutting annular surfaces of the bypass disk member and cap member in engagement, the interengaging coarse threads of the valve stem and bypass disk member defining a second axial clearance space smaller than said first clearance space when the bypass valve disk is in closed position, and the end surface of the valve stem defining a third axial clearance space with an adjacent inner abutment surface of the recess in the bypass disk member, said third axial clearance space being smaller than said second axial clearance space, whereby upon axial movement of the valve stem, the end of the valve stem first closes the third axial clearance space and the bypass valve disk member is caused to move away from the first annular seat portion of the main disk member with said interengaging coarse threaded portions defining axial clearance spaces on both sides of the threads thereof, further axial movement of the valve stem causing said first axial clearance space to close, whereupon still further movement of the valve stem causes movement of the main valve disk member with the force thereon being transmitted entirely through the end surface of the valve stem to the abutting inner surface of the bypass valve disk member and through the annular abutting surfaces of the bypass disk member and cap member with no load on the threaded portions.

References Cited in the file of this patent

UNITED STATES PATENTS

| 255,666 | Pfau | Mar. 28, 1882 |
| 2,333,455 | Warren | Nov. 2, 1943 |
| 2,557,378 | Granberg | June 19, 1951 |
| 3,012,580 | Rogers | Dec. 12, 1961 |

FOREIGN PATENTS

| 405,340 | Italy | Aug. 5, 1943 |
| 1,028,582 | Germany | Apr. 24, 1958 |